United States Patent
Park et al.

(10) Patent No.: US 11,699,813 B2
(45) Date of Patent: Jul. 11, 2023

(54) ELECTROLYTE FOR SECONDARY BATTERY AND SECONDARY BATTERY COMPRISING SAME

(71) Applicants: LG CHEM, LTD., Seoul (KR); DAEGU GYEONGBUK INSTITUTE OF SCIENCE AND TECHNOLOGY, Daegu (KR)

(72) Inventors: Changhun Park, Daejeon (KR); Hochun Lee, Daegu (KR); Sungjin Kang, Daegu (KR); Minchul Jang, Daejeon (KR); Doyeon Kim, Daejeon (KR); Hyeonji Kim, Daegu (KR)

(73) Assignees: LG ENERGY SOLUTION, LTD., Seoul (KR); DAEGI GUEONGBUK INSTITUTE OF SCIENCE AND TECHNOLOGY, Daegu (KR)

(*) Notice: Subject to any disclaimer, the term of this patent is extended or adjusted under 35 U.S.C. 154(b) by 251 days.

(21) Appl. No.: 16/629,239

(22) PCT Filed: Jul. 30, 2018

(86) PCT No.: PCT/KR2018/008633
§ 371 (c)(1),
(2) Date: Jan. 7, 2020

(87) PCT Pub. No.: WO2019/035575
PCT Pub. Date: Feb. 21, 2019

(65) Prior Publication Data
US 2020/0203766 A1 Jun. 25, 2020

(30) Foreign Application Priority Data
Aug. 16, 2017 (KR) .................. 10-2017-0103526

(51) Int. Cl.
*H01M 10/0567* (2010.01)
*H01M 10/054* (2010.01)

(52) U.S. Cl.
CPC ...... *H01M 10/0567* (2013.01); *H01M 10/054* (2013.01); *H01M 2300/0025* (2013.01); *Y02E 60/10* (2013.01)

(58) Field of Classification Search
CPC ................................................. H01M 10/0567
See application file for complete search history.

(56) References Cited

U.S. PATENT DOCUMENTS

2007/0048620 A1* 3/2007 Nakanishi ............ H01G 9/035
429/326
2008/0118843 A1 5/2008 Tarnopolsky
(Continued)

FOREIGN PATENT DOCUMENTS

EP 1926172 A1 5/2008
EP 2704244 A1 3/2014
(Continued)

OTHER PUBLICATIONS

Machine translation of KR 10-1444992 B1 (Ahn) (Year: 2013).*
(Continued)

*Primary Examiner* — Stephan J Essex
(74) *Attorney, Agent, or Firm* — Birch, Stewart, Kolasch & Birch, LLP (57) ABSTRACT

Disclosed is an electrolyte for a secondary battery, and a secondary battery comprising the same, and in particular, to an electrolyte for a secondary battery including an electrolyte salt, an organic solvent and an additive, wherein the additive includes at least one compound selected from the group consisting of a compound having an N—Si-based bond and a compound having an O—Si-based bond.

2 Claims, 4 Drawing Sheets

(56) References Cited

U.S. PATENT DOCUMENTS

| | | |
|---|---|---|
| 2008/0138714 A1 | 6/2008 | Ihara et al. |
| 2008/0206651 A1 | 8/2008 | Kawase et al. |
| 2010/0183926 A1 | 7/2010 | Kim et al. |
| 2011/0076572 A1 | 3/2011 | Amine et al. |
| 2013/0202955 A1 | 8/2013 | Yawata et al. |
| 2015/0072247 A1 | 3/2015 | Cho et al. |
| 2015/0207174 A1 | 7/2015 | Lee et al. |
| 2016/0248121 A1 | 8/2016 | Uematsu et al. |

FOREIGN PATENT DOCUMENTS

| | | | |
|---|---|---|---|
| JP | 2007-87935 A | | 4/2007 |
| JP | 2007-141831 A | | 6/2007 |
| JP | 2008-130544 A | | 6/2008 |
| JP | 2009-38001 A | | 2/2009 |
| JP | 2012-89469 A | | 5/2012 |
| KR | 10-2008-0053183 A | | 6/2008 |
| KR | 10-1065381 B1 | | 9/2011 |
| KR | 10-1265334 B1 | | 5/2013 |
| KR | 10-2013-0098704 A | | 9/2013 |
| KR | 10-1444992 B1 | | 9/2014 |
| KR | 10-2015-0030031 A | | 3/2015 |
| KR | 10-2015-0087457 A | | 7/2015 |
| KR | 10-2015-0143535 A | | 12/2015 |
| KR | 10-2016-0070025 A | | 6/2016 |
| WO | WO 2015/098471 A1 | | 7/2015 |

OTHER PUBLICATIONS

Alternative machine translation from Google Patents of KR 10-1444992 B1 (Ahn) (Year: 2013).*
Extended European Search Report for European Application No. 18845985.3, dated Jun. 25, 2020.
Fukutsuka et al., "New Magnesium-ion Conductive Electrolyte Solution Based on Triglyme for Reversible Magnesium Metal Deposition and Dissolution at Ambient Temperature," Chem. Lett., vol. 43, 2014, pp. 1788-1790.
Ha et saL, "Magnesium(II) Bis(trifluoromethane sulfonyl) Imide-Based Electrolytes with Wide Electrochemical Windows for Rechargeable Magnesium Batteries," ACS Appl. Mater. Interfaces, vol. 6, 2014, pp. 4063-4073.
International Search Report (PCT/ISA/210) issued in PCT/KR2018/008633, dated Oct. 30, 2018.
Kang et al., "Non-Grignard and Lewis Acid-Free Sulfone Electrolytes for Rechargeable Magnesium Batteries," Chem. Mater., vol. 29, 2017, pp. 3174-3180.
Kitada et al., "Electrochemically active species in aluminum electrodeposition baths of AlCh3/glyme solutions," Electrochimica Acta 211, 2016, pp. 561-567.

* cited by examiner

ELECTROLYTE FOR SECONDARY BATTERY AND SECONDARY BATTERY COMPRISING SAME

TECHNICAL FIELD

This application claims the benefits of Korean Patent Application No. 10-2017-0103526, filed on Aug. 16, 2017 with the Korean Intellectual Property Office, the disclosure of which is herein incorporated by reference in its entirety.

The present invention relates to an electrolyte for a secondary battery and a secondary battery comprising the same.

BACKGROUND ART

As electronic devices and communication devices have rapidly become smaller, lighter and more sophisticated recently, and necessity of electric vehicles has highly emerged regarding environmental problems, extensive studies on secondary batteries capable of being used as an energy source of these products have been progressed. Among many secondary batteries, lithium secondary batteries may be manufactured to be small and light, and have many advantages in terms of energy density, discharge voltage and output stability, and the scope of the use is expanding.

A lithium secondary battery is a battery in which lithium ions ($Li^+$) participate in a redox reaction. And specifically, the battery operates as lithium ions included in a positive electrode active material migrate to a negative electrode through an electrolyte and then are inserted between layer-structured negative electrode active materials when charged, and the lithium ions inserted between negative electrode active materials migrate back to the positive electrode when discharged. Herein, capacity of the lithium secondary battery is different depending on the types of the electrode active material, and the lithium secondary battery has not been in full commercialization since sufficient capacity is not secured to a theoretical capacity level in actual operations, and charge and discharge stability and reliability are insufficient.

In addition, lithium is a rare metal present in only 0.002% on the earth's crust. In addition thereto, cobalt and copper widely used as a positive electrode active material of a lithium secondary battery are also rare, and produced mainly in South Africa and South America only, which causes anxiety in securing resources.

In order to secure high capacity, high output and price competitiveness of secondary batteries, studies to use magnesium (Mg), calcium (Ca), aluminum (Al), yttrium (Y), zinc (Zn) and the like that are far less expensive and have energy high density capacity instead of lithium have been recently ongoing.

Compared to conventional secondary batteries operated by monovalent metal cations such as lithium ions or sodium ions ($Na^+$), secondary batteries operated by multivalent metal cations such as magnesium ions ($Mg^{2+}$), calcium ions ($Ca^{2+}$), aluminum ions ($Al^{3+}$) or yttrium ions ($Y^{3+}$) are capable of storing more energies, which is particularly advantageous in increasing capacity.

However, unlike monovalent metals such as lithium or sodium, multivalent metals such as magnesium, calcium, aluminum, yttrium or zinc are difficult to use as a negative electrode material of a secondary battery. This is due to the fact that multivalent metal cations are difficult to disperse into most lithium electrolyte compositions for a secondary battery used in the prior art. Particularly, an organic solvent used in the electrolyte forms a film on the multivalent metal surface, and since resistance of the film produced herein is significantly higher than resistance of the film formed on the monovalent metal surface, an electrochemical deposition/dissolution reaction of the metal ions in a negative electrode is suppressed when driving a battery.

In view of the above, various technologies on electrolytes for a multivalent metal secondary battery have been proposed.

As one example, Se-Young Ha et al. and Tomokazu Fukutsuka et al. have reported that properties of magnesium batteries may be improved by using an electrolyte including a glyme-based solvent And Sung-Jin Kang et al. discloses that properties of magnesium batteries may be improved by using an electrolyte including a dialkyl sulfone-based solvent. In addition, A. Kitada et al. have reported that deposition/dissolution properties of a secondary battery including an aluminum metal may be enhanced by using a glyme-based solvent.

In addition, Korean Patent Application Publication No. 2016-0070025 has disclosed that properties of a secondary battery by a multivalent metal cation may be improved through using an electrolyte including a specific sulfone-based solvent or ether-based solvent and an electrolyte salt.

The prior art documents have somewhat contributed to improving driving properties and stabilizing performance of multivalent ion batteries, however, the effect is not sufficient. In addition, the electrolyte still has low ion conductivity and battery charge and discharge properties, and an electrolyte using a sulfone-based solvent exhibits high viscosity and low ion conductivity at room temperature due to having a high boiling point, which causes deterioration during driving a battery, and ultimately leads to limits in the battery performance. Accordingly, development of an electrolyte for a multivalent metal secondary battery capable of obtaining excellent performance and stable lifetime properties compared to conventional secondary batteries has been more required.

PRIOR ART DOCUMENTS

Patent Documents

Korean Patent Application Publication No. 2016-0070025 (2016 Jun. 17), ELECTROLYTE AND SECONDARY BATTERY COMPRISING THE SAME

Non-Patent Documents

Se-Young Ha et al., Magnesium(II) Bis(trifluoromethane sulfonyl) Imide-Based Electrolytes with Wide Electrochemical Windows for Rechargeable Magnesium Batteries, *ACS Appl. Mater. Interfaces*, 2014, 6(6), pp. 4063-4073

T. Fukutsuka et al., New Magnesium-ion Conductive Electrolyte Solution Based on Triglyme for Reversible Magnesium Metal Deposition and Dissolution at Ambient Temperature, *Chem. Lett.*, 2014, 43(11) pp. 1788-1790

Sung-Jin Kang et al., Non-Grignard and Lewis Acid-Free Sulfone Electrolytes for Rechargeable Magnesium Batteries, *Chem. Mater.*, 2017, 29(7), pp. 3174-3180

A. Kitada et al., Electrochemically active species in aluminum electrodeposition baths of AlCl3/glyme solutions, *Electrochimica Acta*, 2016, 211, pp. 561-567

DISCLOSURE

Technical Problem

As a result of extensive studies in view of the above, the inventors of the present invention have identified that, when including a compound including a specific chemical bond as an additive in an electrolyte liquid for a secondary battery, charge and discharge efficiency and lifetime of a secondary battery operated by a multivalent metal cation are enhanced by suppressing a film formation caused by side reactions between the multivalent metal and the electrolyte, and have completed the present invention.

Accordingly, an aspect of the present invention provides an electrolyte for a secondary battery having excellent charge and discharge efficiency.

Another aspect of the present invention provides a secondary battery including the electrolyte.

Technical Solution

According to an aspect of the present invention, there is provided an electrolyte for a secondary battery including an electrolyte salt, an organic solvent and an additive, wherein the additive comprises at least one compound selected from the group consisting of a compound having an N—Si-based bond and a compound having an O—Si-based bond.

The compound having an N—Si-based bond may comprise at least one selected from the group consisting of hexamethyldisilazane, heptamethyldisilazane, 2-allyl-1,1,1, 3,3,3-hexamethyldisilazane, N,N-diethylamino trimethylsilane, N,N-dimethylamino trimethylsilane, tris(trimethylsilyl)amine, trimethyl(allylamino)silane and N,N,O-tris (trimethylsilyl)hydroxyamine.

The compound having an O—Si-based bond may comprise at least one selected from the group consisting of hexamethyldisiloxane, octamethyltrisiloxane, tris(trimethylsilyl)phosphate, tris(trimethylsilyl)phosphite and tris(trimethylsilyl)borate.

The additive may be included in an amount of from 1% by weight to 5% by weight based on the total weight of the electrolyte for a secondary battery.

The electrolyte salt may comprise a multivalent metal cation. The metal of the multivalent metal cation may comprise at least one metal selected from the group consisting of magnesium, calcium, aluminum and zinc.

According to another aspect of the present invention, there is provided a secondary battery comprising the electrolyte.

Advantageous Effects

When an electrolyte for a secondary battery according to the present invention comprises a compound having an N—Si-based bond or an O—Si-based bond as an additive, film formation on a multivalent metal surface is suppressed and moisture in the electrolyte is removed, and as a result, multivalent metal secondary battery properties, particularly charge and discharge efficiency, can be enhanced.

BEST MODE

Hereinafter, the present invention will be described in more detail.

Terms or words used in the present invention and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present invention. Singular forms include plural forms as well, unless the context clearly indicates otherwise. In the present invention, terms such as "include" or "have" are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof.

Multivalent metals including magnesium have many advantages as an electrode material such as low redox potential and high theoretical capacity, and twice a current may be obtained per unit reaction compared to monovalent metals such as lithium or sodium since the number of electrons transferred during the redox reaction is two. In addition, abundant reserves, low costs, environmental-friendliness, handling easiness and the like of the multivalent metals are advantageous in terms of not only performance but also stability and price competitiveness, and multivalent metals secondary batteries have received attention as a next generation battery.

Despite such advantages, both theoretical capacity and energy density have not been obtained in actual operations. This is due to the fact that multivalent metals are difficult to mix with an electrolyte used in conventional lithium secondary batteries, and in addition thereto, a metal hydroxide present on the metal surface readily reacts with an electrolyte solvent to produce insoluble salts, and a reversible electrodeposition/dissolution reaction may not be performed by the produced insoluble salts forming a film on the electrode surface lowering electrode reactivity.

In view of the above, various electrolyte compositions have been proposed in the prior art to enhance diffusion and dispersion properties of multivalent metal ions and to increase electrochemical reversibility, however, efficiency and lifetime of a multivalent metal secondary battery have not been effectively improved.

In view of the above, the present invention provides an electrolyte for a multivalent metal secondary battery including a specific compound as an additive in order to suppress side reactions with an electrolyte forming a film on an electrode surface.

Specifically, the electrolyte for a secondary battery according to the present invention comprises an electrolyte salt, an organic solvent and an additive, wherein the additive comprises at least one compounds selected from the group consisting of a compound having an N—Si-based bond and a compound having an O—Si-based bond.

In the prior art, compounds including the bonds described above have been used as an electrolyte additive for a lithium secondary battery, however, the goal was mainly to suppress a deterioration phenomenon or to enhance a low temperature output. Particularly, when used for preventing deterioration, the additive has been for forming a protective layer such as a solid electrolyte interphase (SEI) or a film on an electrode surface, whereas, in the present invention, the additive is effective in suppressing film formation.

According to the present invention, the additive performs a role of preventing side reactions forming a film on a multivalent metal surface by including at least one or more of N—Si-based bonds or O—Si-based bonds, and problems of declining electrode reactivity and battery properties may be resolved therefrom.

Examples of the compound having an N—Si-based bond may comprise at least one selected from the group consisting of hexamethyldisilazane, heptamethyldisilazane, 2-allyl-1,1,1,3,3,3-hexamethyldisilazane, N,N-diethylamino trimethylsilane, N,N-dimethylamino trimethylsilane, tris(trimethylsilyl)amine, trimethyl(allylamino)silane and N,N,O-tris(trimethylsilyl)hydroxyamine. Preferably, at least one selected from the group consisting of hexamethyldisilazane, heptamethyldisilazane, N,N-diethylamino trimethylsilane and tris(trimethylsilyl)amine may be included. And more preferably, at least one selected from the group consisting of hexamethyldisilazane and heptamethyldisilazane may be included.

Examples of the compound having an O—Si-based bond may comprise at least one selected from the group consisting of hexamethyldisiloxane, octamethyltrisiloxane, tris(trimethylsilyl)phosphate, tris(trimethylsilyl)phosphite and tris(trimethylsilyl)borate. Preferably, at least one selected from the group consisting of hexamethyldisiloxane and tris(trimethylsilyl)phosphite may be included.

When including a multivalent metal as an electrode in a general multivalent metal secondary battery, the surface is coated with a metal hydroxide such as $Mg(OH)_2$, $Ca(OH)_2$ or $Al(OH)_3$, and such a metal hydroxide causes formation of a film formed with insoluble salts. However, in the present invention, film formation on an electrode surface is prevented by the additive reacting with the metal hydroxide and converting the metal hydroxide to a soluble form. In addition, by removing moisture in the electrolyte, the additive suppresses an electrolyte decomposition reaction and enhances electrolyte stability therethrough. According to one embodiment of the present invention, when using heptamethyldisilazane as the additive, the reaction suppressing film formation described above may be represented by the following Reaction Formula 1, and the reaction removing moisture in the electrolyte may be represented by the following Reaction Formula 2.

[Reaction Formula 1]

[Reaction Formula 2]

By the additive being used in a secondary battery operated by a multivalent metal cation such as $Mg^{2+}$, $Ca^{2+}$ or $Al^{3+}$ instead of a monovalent metal cation such as $Li^+$, charge and discharge coulombic efficiency of a metal negative electrode battery may be maximized by removing moisture in the electrolyte used in the multivalent cation secondary battery and suppressing formation of a film having very high resistance on a Mg, Ca or Al metal negative electrode surface.

The additive may be included in an amount of from 1% by weight to 5% by weight and preferably, in 1.5% by weight to 3.5% by weight based on the total weight of the electrolyte for a secondary battery. When the additive included in the electrolyte is included in less than the above-mentioned range, the effect of addition is insignificant and an effect of improving battery properties is low, and when included in greater than the above-mentioned range on the contrary, the additive functions as resistance causing unnecessary reactions when driving a battery, which may adversely affect battery performance, and therefore, a proper content needs to be determined within the above-mentioned range. However, a specific optimal content of the additive may be set differently depending on an electrolyte to provide, other properties of a battery provided therewith and environments of use, and such use is not meant to be limited by the above-mentioned preferred range.

The electrolyte for a secondary battery of the present invention may include common electrolyte components, for example, an electrolyte salt and an organic solvent.

The electrolyte salt is not particularly limited as long as it is dissociated into cations and anions in an organic solvent and transfers multivalent metal ions in a multivalent metal secondary battery, and those generally used in the art may be used without limit.

The electrolyte salt may be represented by the following Chemical Formulae 1 to 3:

$R_1MX$  [Chemical Formula 1]

$MX_2$  [Chemical Formula 2]

$M(R_2)_2$  [Chemical Formula 3]

wherein $R_1$ is a linear or branched alkyl group having 1 to 10 carbon atoms, a aryl group having 6 to 10 carbon atoms or a linear or branched amine group having 1 to 10 carbon atoms, M is Mg, Ca, Al or Zn, X is a halogen atom and $R_2$ is an alkyl group having 1 to 20 carbon atoms, a dialkylboron group having 1 to 20 carbon atoms, a diarylboron group having 6 to 20 carbon atoms, an alkylcarbonyl group having 1 to 20 carbon atoms or an alkylsulfonyl group having 1 to 20 carbon atoms, a perchloric acid group ($ClO_4^-$) or hexafluoro arsenate ($AsF6^-$).

Specifically, in Chemical Formula 1, $R_1$ may be a methyl group, an ethyl group, a butyl group, a phenyl group or an aniline group, X may be a halogen atom, for example, chlorine or bromine. In Chemical Formula 2, X may be, for example, chlorine, bromine or iodine. In addition, in Chemical Formula 3, examples of the alkylcarbonyl group of $R_2$ may include a methylcarbonyloxyl group ($CH_3CO_2^-$, and examples of the alkylsulfonyl group may include a trifluoromethylsulfonyl group ($CF_3SO_2^-$).

For example, the electrolyte salt may be $MgCl_2$, $MgBr_2$, $MgI_2$, $CaCl_2$, $CaBr_2$, $CaI_2$, $Mg(AlCl_2BuEt)_2$ (Bu is an abbreviation of a butyl group, and Et is an abbreviation of an ethyl group), $Mg(ClO_4)_2$, $Mg(PF_6)_2$, $Mg(BF_4)_2$, $Mg(CF_3SO_3)_2$, $Mg(N(CF_3SO_2)_2)_2(Mg(TFSI)_2)$, $MgN(C_2F_5SO_2)_2$, $MgC(CF_3SO_2)_3$ or the like.

A concentration of the electrolyte salt may be properly determined considering ion conductivity, solubility and the like, and for example, may be from 0.2 M to 4 M, preferably from 0.3 M to 3 M and more preferably from 0.5 M to 2 M. When the concentration of the electrolyte salt is less than the above-mentioned range, ion conductivity suitable for battery driving is difficult to secure, and when the concentration is greater than the above-mentioned range on the contrary, mobility of the multivalent metal ions decreases by increasing resistance or viscosity, and battery performance may decline by increasing a decomposition reaction of the electrolyte salt itself, and therefore, the concentration is properly controlled within the above-mentioned range.

The organic solvent has high oxidation potential, and those capable of dissolving the electrolyte salt are used. As the organic solvent, those commonly used as an electrolyte for a secondary battery may be used without limit, and these may be used either each alone or as a mixture of two or more types.

For example, cyclic carbonate-based, linear carbonate-based, ether-based, sulfone-based, ester-based, nitrile-based, phosphate-based solvents either including or not including halogen substituents, mixtures thereof, or the like, may be used as the organic solvent. For example, propylene carbonate (PC), ethylene carbonate (EC), diethyl carbonate (DEC), dimethyl carbonate (DMC), dipropyl carbonate (DPC), ethylene glycol dimethyl ether (glyme, 1G), diethylene glycol dimethyl ether (diglyme, 2G), triethylene glycol dimethyl ether (triglyme, 3G), tetraethylene glycol dimethyl ether (tetraglyme, 4G), dimethyl sulfone, diethyl sulfone, ethylmethyl sulfone, dipropyl sulfone, dibutyl sulfone, diphenyl sulfone, dimethyl sulfoxide, acetonitrile, dimethoxyethane, diethoxyethane, tetrahydrofuran (THF), N-methyl-2-pyrrolidone (NMP), ethylmethyl carbonate(EMC), gamma butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate and butyl propionate, mixtures thereof or the like may be used.

In addition to the compositions described above, the electrolyte for a secondary battery of the present invention may include various additives as necessary. Specifically, for the purpose of improving charge and discharge properties, flame retardancy and the like, pyridine, triethylphosphite, triethanolamine, cyclic ether, ethylenediamine, diglyme, hexamethyl phosphoramide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride and the like may be added, for example. In some cases, halogen-containing solvents such as carbon tetrachloride and trifluoroethylene may be further included in order to provide nonflammability.

In addition, the present invention provides a secondary battery including the electrolyte.

The secondary battery includes a positive electrode; a negative electrode; and a separator and an electrolyte interposed between the positive electrode and the negative electrode, and as the electrolyte, the electrolyte for a secondary battery according to the present invention is used.

The positive electrode and the negative electrode may be prepared using common methods known in the art, and may be prepared through preparing electrode slurry by mixing each of a positive electrode active material and a negative electrode active material with a binder, a dispersant and the like, and coating the prepared electrode slurry on a current collector, and rolling and drying the result. Herein, a small amount of a conductive material and/or a binder may be selectively added.

The positive electrode may include a positive electrode current collector and a positive electrode active material coated on one surface or both surfaces of the positive electrode current collector.

The positive electrode current collector is for supporting the positive electrode active material, and is not particularly limited as long as it has excellent conductivity and is electrochemically stable in a voltage region of a secondary battery. For example, the positive electrode current collector may be any one metal selected from the group consisting of copper, aluminum, stainless steel, titanium, silver, palladium, nickel, alloys thereof and combinations thereof, and the stainless steel may have its surface treated with carbon, nickel, titanium or silver, and aluminum-cadmium alloys may be used as the alloy, and in addition thereto, baked carbon, nonconductive polymers of which surface is treated with a conductive material, conductive polymers or the like may also be used.

The positive electrode current collector may strengthen binding force with the positive electrode active material by forming micro-unevenness on the surface, and various forms such as films, sheets, foil, meshes, nets, porous bodies, foams and non-woven fabrics may be used.

The positive electrode active material may include a positive electrode active material, and selectively, a conductive material and a binder.

As the positive electrode active material, all materials producing a reaction of multivalent metal cation deintercalation or conversion may be used.

For example, as the positive electrode active material, oxide-based compounds such as manganese oxide ($MnO_2$), vanadium oxide ($V_2O_5$) or iron oxide, sulfide-based compounds such as $Mo_6S_8$ or $TiS_2$, polyanion-based compounds such as $FeSiPO_4$, and conversion-type compounds such as $MF_2$ (M is Fe or Cu) may be used.

The conductive material is a material electrically connecting the positive electrode active material and the electrolyte and thereby performing a role of a path for electrons to migrate from a current collector to the active material, and is not limited as long as it has porosity and conductivity, and does not cause chemical changes in a formed battery.

For example, carbon-based materials having porosity may be used, and as such carbon-based materials, carbon black, graphite, graphene, active carbon, carbon fiber and the like may be included, and metallic fibers such as a metal mesh; metallic powders such as copper, silver, nickel or aluminum;

or organic conducting materials such as polyphenylene derivatives may be included. The conductive materials may be used either alone or as a mixture. As products commercially available currently, acetylene black series (products of Chevron Chemical Company or Gulf Oil Company, or the like), ketjen black EC series (products of Armak Company), Vulcan XC-72 (products of Cabot Company), super P (products of MMM) and the like may be included.

The binder is a material included for retaining a slurry composition forming the positive electrode on a current collector, and materials favorably dissolved in a solvent and capable of stably forming a conducting network with the active material and the conductor described above are used. Unless particularly limited, all binders known in the art may be used. For example, as the binder, one type selected from the group consisting of fluororesin-based binders including polyvinylidene fluoride (PVdF) or polytetrafluoroethylene (PTFE); rubber-based binders including styrene-butadiene rubber (SBR), acrylonitrile-butadiene rubber or styrene-isoprene rubber; cellulose-based binders including carboxylmethylcellulose (CMC), starch, hydroxypropylcellulose or regenerated cellulose; polyalcohol-based binders; polyolefin-based binders including polyethylene or polypropylene; polyimide-based binders; polyester-based binders; and silane-based binders, or mixtures or copolymers of two or more types thereof may be used.

Like the positive electrode, the negative electrode may include a negative electrode active material, a conductive material and a binder, and herein, the conductive material and the binder are the same as described above.

As the negative electrode active material, Mg metal, Ca metal or Al metal, or all materials producing a deintercalation or alloy/non-alloy reaction of these Mg, Ca or Al ions may be used.

Specifically, as the negative electrode active material, Mg metal, Ca metal or Al metal may be used, and carbonaceous materials such as artificial graphite, natural graphite, graphitized carbon fiber or amorphous carbon capable of deintercalation of the Mg, Ca or Al ions, lithium titanium oxides, and alloys of magnesium and bismuth or tin producing an alloy/non-alloy reaction with Mg metal, Ca metal or Al metal may be used.

Nonlimiting examples of the lithium titanium oxide may include at least one selected from among $Li_{0.8}Ti_{2.2}O_4$, $Li_{2.67}Ti_{1.33}O_4$, $LiTi_2O_4$, $Li_{1.33}Ti_{1.67}O_4$ and $Li_{1.14}Ti_{1.71}O_4$, but may be not limited thereto.

To each of the negative electrode and the positive electrode, a conductive lead member for collecting currents produced when operating a battery may be attached, and the lead member may induce the currents produced in the positive electrode and the negative electrode to a positive electrode terminal and a negative electrode terminal, respectively.

The separator is for physically separating both electrodes in the secondary battery of the present invention, and those commonly used as a separator in a secondary battery may be used without particular limit, and those having an excellent electrolyte moisture-containing ability while having low resistance for ion migration of the electrolyte are particularly preferred.

The separator may be formed with a porous base, and as the porous base, porous bases commonly used in electrochemical devices may all be used, and for example, polyolefin-based porous membranes or non-woven fabrics may be used, however, the porous base is not particularly limited thereto.

As examples of the polyolefin-based porous membrane, membranes formed with a polyolefin-based polymer such as polyethylene such as high density polyethylene, linear low density polyethylene, low density polyethylene and ultra-high molecular weight polyethylene, polypropylene, polybutylene and polypentene each alone, or formed with a polymer mixing these may be included.

In addition to polyolefin-based non-woven fabrics, non-woven fabrics formed with, for example, polyethylene terephthalate, polybutylene terephthalate, polyester, polyacetal, polyamide, polycarbonate, polyimide, polyetheretherketone, polyether sulfone, polyphenylene oxide, polyphenylene sulfide, polyethylene naphthalate and the like each alone, or formed with a polymer mixing these may be included as the non-woven fabric. The structure of the non-woven fabric may include spunbond non-woven fabrics or meltblown non-woven fabrics formed with long fibers.

A thickness of the porous base is not particularly limited, but may be from 1 µm to 100 µm, and may be preferably from 5 µm to 50 µm.

Sizes of pores present in the porous base and porosity are not particularly limited as well, but may be from 0.001 µm to 50 µm and from 10% to 95%, respectively.

The electrolyte is by the present invention, and follows the descriptions provided above.

The electrolyte may include at least one types selected from the group consisting of a liquid electrolyte, a gel polymer electrolyte and a solid polymer electrolyte. The electrolyte may preferably be an electrolyte in a liquid state.

The electrolyte may be injected at a proper stage in an electrochemical device manufacturing process depending on a manufacturing process and required properties of a final product. In other words, the electrolyte may be used at a stage prior to assembling an electrochemical device or at a final stage of electrochemical device assembly.

The secondary battery according to the present invention may go through lamination (stack) and folding processes of a separator and an electrode in addition to winding, a general process.

The shape of the secondary battery is not particularly limited, and may employ various shapes such as a cylinder-type, a lamination-type or a coin-type.

Mode for Invention

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

EXAMPLE AND COMPARATIVE EXAMPLE: PREPARATION OF ELECTROLYTE

Example 1

To an organic solvent mixing dipropyl sulfone ($DPSO_2$) and tetrahydrofuran (THF) in a volume ratio of 1:1, $MgCl_2$ was added in a concentration of 0.8 M as an electrolyte salt, and 2% by weight of tris(trimethylsilyl)phosphite was added as an additive to prepare an electrolyte for a secondary battery.

Example 2

An electrolyte was prepared in the same manner as in Example 1 except that, as the additive, hexamethyldisilazane was added in the same content instead of tris(trimethylsilyl) phosphite.

Example 3

An electrolyte was prepared in the same manner as in Example 1 except that, as the additive, heptamethyldisilazane was added in the same content instead of tris(trimethylsilyl)phosphite.

Example 4

An electrolyte was prepared in the same manner as in Example 1 except that triethylene glycol dimethyl ether (triglyme, 3G) was used as the electrolyte solvent, and $Mg(TFSI)_2$ was used in a concentration of 0.5 M as the electrolyte salt.

Example 5

An electrolyte was prepared in the same manner as in Example 1 except that triethylene glycol dimethyl ether was used as the electrolyte solvent, $Mg(TFSI)_2$ was used in a concentration of 0.5 M as the electrolyte salt, and hexamethyldisilazane was used in the same content as the additive.

Example 6

An electrolyte was prepared in the same manner as in Example 1 except that triethylene glycol dimethyl ether was used as the electrolyte solvent, $Mg(TFSI)_2$ was used in a concentration of 0.5 M as the electrolyte salt, and heptamethyldisilazane was used in the same content as the additive.

Example 7

An electrolyte was prepared in the same manner as in Example 1 except that triethylene glycol dimethyl ether was used as the electrolyte solvent, $Mg(TFSI)_2$ was used in a concentration of 0.5 M as the electrolyte salt, and the additive was added in 0.5% by weight.

Example 8

An electrolyte was prepared in the same manner as in Example 1 except that triethylene glycol dimethyl ether was used as the electrolyte solvent, $Mg(TFSI)_2$ was used in a concentration of 0.5 M as the electrolyte salt, and the additive was added in 6% by weight.

Example 9

An electrolyte was prepared in the same manner as in Example 1 except that triethylene glycol dimethyl ether was used as the electrolyte solvent, $Mg(TFSI)_2$ was used in a concentration of 0.5 M as the electrolyte salt, and the additive was added in 10% by weight.

Comparative Example 1

An electrolyte was prepared in the same manner as in Example 1 except that the additive was not used.

Comparative Example 2

An electrolyte was prepared in the same manner as in Example 1 except that triethylene glycol dimethyl ether was used as the electrolyte solvent, $Mg(TFSI)_2$ was used in a concentration of 0.5 M as the electrolyte salt, and the additive was not used.

Experimental Example 1. Evaluation on Charge and Discharge Efficiency

First, a Pt disk electrode was used as a working electrode of a secondary battery, and magnesium metal was used as a reference electrode and a counter electrode, and using each of the electrolytes prepared in the Examples 1 to 9 and Comparative Examples 1 and 2, electrochemical deposition/dissolution reactions of magnesium were evaluated.

Herein, the electrochemical deposition/dissolution properties of magnesium were measured in a glove box under argon (Ar) atmosphere with a moisture and oxygen concentration of 10 ppm or less under a condition of a scan rate of 20 mV/s and a temperature of 25° C. using cyclic voltammetry (CV). The results obtained herein were shown in Table 1 and FIGS. 1 to 3.

TABLE 1

|  | Solvent (Volume Ratio) | Electrolyte Salt (Molar Concentration) | Additive (% by Weight) | Coulombic Efficiency (%) |
|---|---|---|---|---|
| Example 1 | $DPSO_2$/THF (1/1) | $MgCl_2$ (0.8M) | Tris(trimethylsilyl) phosphite (2) | 86 |
| Example 2 | $DPSO_2$/THF (1/1) | $MgCl_2$ (0.8M) | Hexamethyldisilazane (2) | 83 |
| Example 3 | $DPSO_2$/THF (1/1) | $MgCl_2$ (0.8M) | Heptamethyldisilazane (2) | 86 |
| Example 4 | 3G | $Mg(TFSI)_2$ (0.5M) | Tris(trimethylsilyl) phosphite (2) | 42 |
| Example 5 | 3G | $Mg(TFSI)_2$ (0.5M) | Hexamethyldisilazane (2) | 41 |
| Example 6 | 3G | $Mg(TFSI)_2$ (0.5M) | Heptamethyldisilazane (2) | 66 |
| Example 7 | 3G | $Mg(TFSI)_2$ (0.5M) | Tris(trimethylsilyl) phosphite (0.5) | 20 |
| Example 8 | 3G | $Mg(TFSI)_2$ (0.5M) | Tris(trimethylsilyl) phosphite (6) | 27 |
| Example 9 | 3G | $Mg(TFSI)_2$ (0.5M) | Tris(trimethylsilyl) phosphite (10) | — |

TABLE 1-continued

| | Solvent (Volume Ratio) | Electrolyte Salt (Molar Concentration) | Additive (% by Weight) | Coulombic Efficiency (%) |
|---|---|---|---|---|
| Comparative Example 1 | DPSO$_2$/THF (1/1) | MgCl$_2$ (0.8M) | — | 58 |
| Comparative Example 2 | 3G | Mg(TFSI)$_2$ (0.5M) | — | 20 |

Figure 1:
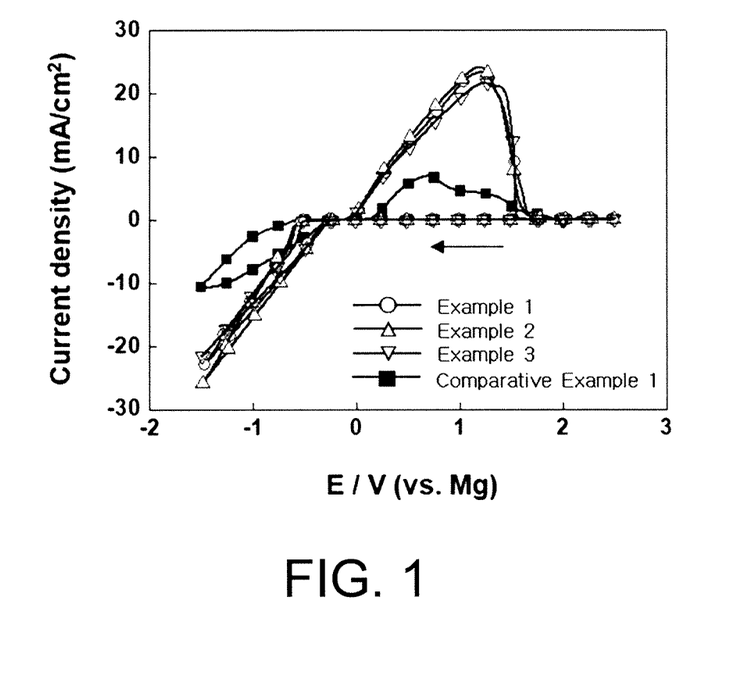
FIG. 1 is a graph presenting results of measuring a cyclic voltage for an electrochemical deposition/dissolution reaction of magnesium in electrolytes prepared in Example 1, Example 2, Example 3 and Comparative Example 1 of the present invention.
Figure 2:
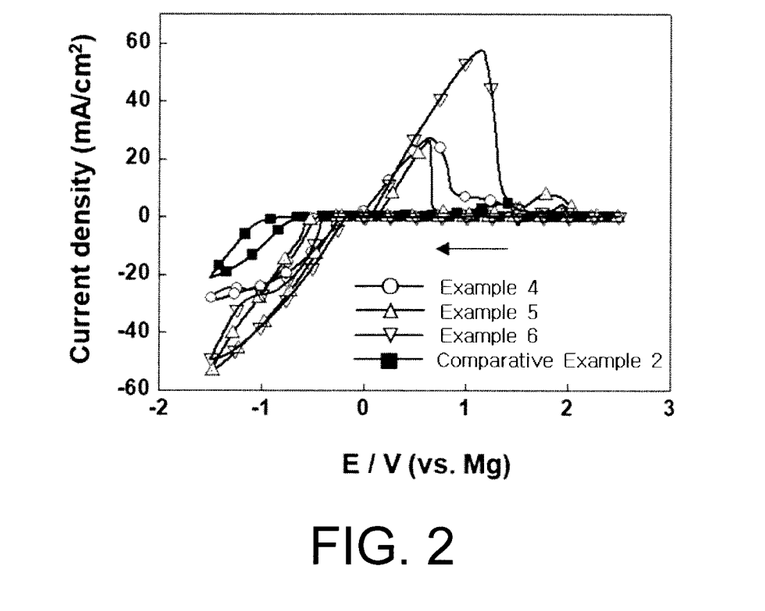
FIG. 2 is a graph presenting results of measuring a cyclic voltage for an electrochemical deposition/dissolution reaction of magnesium in electrolytes prepared in Example 4, Example 5, Example 6 and Comparative Example 2 of the present invention.
Figure 3:
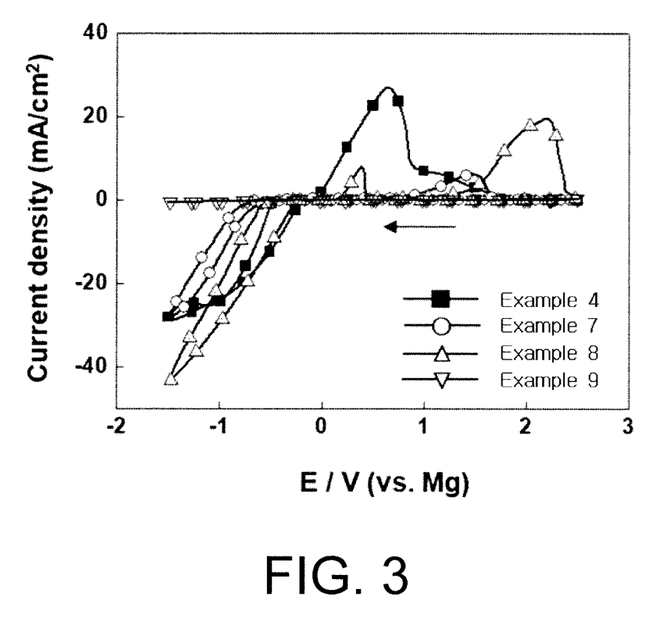
FIG. 3 is a graph presenting results of measuring a cyclic voltage for an electrochemical deposition/dissolution reaction of magnesium in electrolytes prepared in Example 4, Example 7, Example 8 and Example 9 of the present invention.
Figure 4:
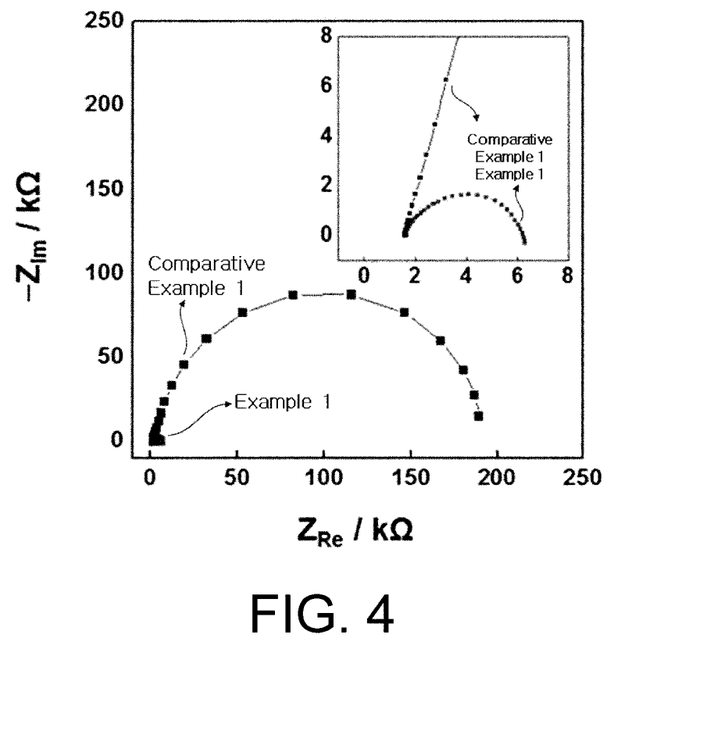
FIG. 4 is a graph presenting results of measuring electrochemical resistance spectroscopy of a magnesium secondary battery using each of electrolytes prepared in Example 1 and Comparative Example 1 of the present invention.

First CV cycles for the electrochemical deposition/dissolution reactions of magnesium in the electrolytes prepared in the examples and the comparative examples were shown in FIGS. 1 to 3. As shown in FIG. 1 and Table 1, it was seen that coulombic efficiency of the electrochemical deposition/dissolution reactions of magnesium in the electrolytes prepared in Example 1, Example 2 and Example 3 was very superior of 83% or greater.

In addition, it was seen that coulombic efficiency of the electrochemical deposition/dissolution reactions of magnesium in the electrolytes of Example 4, Example 5, Example 6 and Comparative Example 2 prepared while varying an organic solvent and an electrolyte salt forming the electrolyte was from 41% to 66%, which was superior by two times or more compared to Comparative Example 2.

In addition, as shown in FIG. 3 and Table 1, it was seen that, when comparing Examples 7 to 9 using the additive in the content less than or greater than the content rage of 1% by weight to 5% by weight with Example 4, the electrochemical deposition/dissolution properties of magnesium were relatively not different or inferior. From these results, it can be identified that the content range of the additive needs to be within proper % by weight to exhibit superior properties.

As described above, the electrolytes of Examples 1 to 6 according to the present invention including the additive had an excellent coulombic efficiency increase in the magnesium ion deposition/dissolution.

Experimental Example 2. Evaluation on Magnesium Battery Electrochemical Resistance Spectroscopic Measurement (EIS)

In order to evaluate properties of magnesium surface resistance decrease of the electrolyte for a magnesium secondary battery resulted in the present invention, the following magnesium/magnesium symmetric electrode secondary battery was manufactured.

A magnesium positive electrode and a magnesium negative electrode were placed to face each other, and after interposing a polyethylene separator therebetween, the electrolyte prepared in each of Example 1 and Comparative Example 1 was injected to manufacture two secondary batteries.

For electrochemical resistance spectroscopic measurements (EIS) of the manufactured batteries, EIS in a 100 kHz to 100 mHz region was measured, and an equivalent circuit Nyquist graph was shown in FIG. 3.

Through the results of FIG. 3, it was identified that the electrolyte of Example 1 had far lower magnesium surface resistance than the electrolyte of Comparative Example 1.

INDUSTRIAL APPLICABILITY

By including an additive including a specific chemical bond, the electrolyte for a secondary battery according to the present invention suppresses film formation on a multivalent metal surface, and enables high capacity, high stability and long lifetime of a multivalent metal secondary battery.

The invention claimed is:
1. An electrolyte for a multivalent metal secondary battery, comprising:
   an electrolyte salt;
   an organic solvent; and
   an additive,
   wherein the additive comprises at least one compound selected from the group consisting of hexamethyldisilazane, heptamethyldisilazane and tris(trimethylsilyl) phosphite,
   wherein the additive is present in an amount of 2% by weight based on the total weight of the electrolyte for a secondary battery,
   wherein the electrolyte salt comprises MgCl$_2$, and
   wherein the organic solvent comprises dipropyl sulfone and tetrahydrofuran.
2. A multivalent metal secondary battery comprising the electrolyte of claim 1.

* * * * *